United States Patent
Moon et al.

(10) Patent No.: US 11,283,971 B2
(45) Date of Patent: Mar. 22, 2022

(54) FOLDABLE ELECTRONIC DEVICE INCLUDING A PLURALITY OF CAMERA MODULES

(71) Applicant: Samsung Electronics Co., Ltd., Suwon-si (KR)

(72) Inventors: Chanyoung Moon, Suwon-si (KR); Hokeun Kwak, Suwon-si (KR); Doosik Park, Suwon-si (KR); Woosung Chun, Suwon-si (KR); Mooyoung Kim, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/843,127

(22) Filed: Apr. 8, 2020

(65) Prior Publication Data

US 2020/0329178 A1 Oct. 15, 2020

(30) Foreign Application Priority Data

Apr. 10, 2019 (KR) ........................ 10-2019-0042101

(51) Int. Cl.
*H04N 5/225* (2006.01)
*H04M 1/02* (2006.01)

(52) U.S. Cl.
CPC ........ *H04N 5/2252* (2013.01); *H04M 1/0264* (2013.01); *H04M 1/0268* (2013.01); *H04N 5/2254* (2013.01); *H04M 2250/52* (2013.01)

(58) Field of Classification Search
CPC .. G06F 1/1652; G06F 1/1686; H04M 1/0214; H04M 1/0264; H04M 1/0268; H04M 2250/22; H04M 2250/52; H04N 5/2252; H04N 5/2254
See application file for complete search history.

(56) References Cited

U.S. PATENT DOCUMENTS

| 7,400,902 B2* | 7/2008 | Jeon ................. H04M 1/72445 455/550.1 |
| 7,583,988 B2 | 9/2009 | Jeon |
| 7,856,180 B2 | 12/2010 | Chishima |

(Continued)

FOREIGN PATENT DOCUMENTS

WO 2018/048183 A1 3/2018

OTHER PUBLICATIONS

European Search Report dated Jul. 16, 2020, issued in European Application No. 20168841.3.

(Continued)

*Primary Examiner* — Amy R Hsu
(74) *Attorney, Agent, or Firm* — Jefferson IP Law, LLP

(57) ABSTRACT

A foldable electronic device is provided. The electronic device includes a housing including a first housing and a second housing, a flexible display including a first display part and a second display part, a first camera module mounted in the first housing and disposed adjacent to the cutting structure, and a second camera module and a third camera module mounted in the second housing, in which the first housing includes a notch having any suitable shape. At least one of the second camera module or the third camera module is disposed to face the same direction as the first camera module when the first housing and the second housing are folded.

20 Claims, 9 Drawing Sheets

(56) References Cited

U.S. PATENT DOCUMENTS

| | | | |
|---|---|---|---|
| 8,483,766 | B2 | 7/2013 | Jeon |
| 8,903,462 | B2 | 12/2014 | Jeon |
| 9,986,144 | B2 | 5/2018 | Tuulos et al. |
| 10,140,018 | B2 | 11/2018 | Kim et al. |
| 10,152,088 | B2 | 12/2018 | Ka et al. |
| 10,237,461 | B2 | 3/2019 | Ramaprakash et al. |
| 10,264,186 | B2 | 4/2019 | Lei et al. |
| 10,506,153 | B2 | 12/2019 | Kang et al. |
| 10,564,675 | B2 | 2/2020 | Ka et al. |
| 10,616,489 | B2 | 4/2020 | Lei et al. |
| 10,635,137 | B2 | 4/2020 | Park et al. |
| 2009/0148149 | A1 | 6/2009 | Chishima |
| 2013/0150130 | A1 | 6/2013 | Jeon |
| 2014/0029190 | A1* | 1/2014 | Sato .................. G06F 1/1641 361/679.27 |
| 2015/0229746 | A1* | 8/2015 | Bergin ................ H04B 1/3888 455/556.1 |
| 2016/0324023 | A1 | 11/2016 | Kim et al. |
| 2016/0381262 | A1* | 12/2016 | Shi ..................... H04N 5/2254 348/47 |
| 2017/0045996 | A1 | 2/2017 | Ka et al. |
| 2017/0052566 | A1 | 2/2017 | Ka et al. |
| 2017/0094168 | A1 | 3/2017 | Kang et al. |
| 2017/0353633 | A1* | 12/2017 | Eromaki ............. H05K 5/0226 |
| 2017/0353643 | A1* | 12/2017 | Tuulos .............. H04N 5/23212 |
| 2017/0357473 | A1* | 12/2017 | Kim .................... G06F 3/04883 |
| 2018/0007243 | A1* | 1/2018 | Maatta ................ H04N 5/2252 |
| 2018/0255219 | A1* | 9/2018 | Ramaprakash ........ H04N 5/247 |
| 2019/0007619 | A1 | 1/2019 | Lei et al. |
| 2019/0007620 | A1 | 1/2019 | Lei et al. |
| 2019/0246022 | A1 | 8/2019 | Ramaprakash et al. |
| 2019/0361501 | A1 | 11/2019 | Park et al. |
| 2021/0021768 | A1* | 1/2021 | Tong .................... G06F 1/182 |

OTHER PUBLICATIONS

International Search Report dated Jul. 30, 2020, issued in International Application No. PCT/KR2020/004856.

* cited by examiner

FOLDABLE ELECTRONIC DEVICE INCLUDING A PLURALITY OF CAMERA MODULES

CROSS-REFERENCE TO RELATED APPLICATION(S)

This application is based on and claims priority under 35 U.S.C. § 119(a) of a Korean patent application number 10-2019-0042101, filed on Apr. 10, 2019, in the Korean Intellectual Property Office, the disclosure of which is incorporated by reference herein its entirety.

BACKGROUND

1. Field

The disclosure relates to a foldable electronic device including a plurality of camera modules.

2. Description of Related Art

Foldable electronic devices having a flexible display that can be folded or unfolded have recently come to market. A user may use a wide display screen of a foldable electronic device in an unfolded state and may conveniently carry the foldable electronic device in a folded state. The foldable electronic device may include one or more camera modules. The foldable electronic device may take a photo or video with the camera modules.

A general bar-type electronic device (e.g., a general smartphone in a rectangular shape rather than a foldable electronic device) may include a first camera module for front photography (e.g., taking a self-portrait) and a second camera module and/or a third camera module for photography. The first camera module, the second camera module, and the third camera module may include lenses having different characteristics (e.g., a wide lens and a tele lens).

The foldable electronic device may include an additional camera module to be used similar to the bar-type electronic device.

For example, in the case of an outward folding electronic device (a type in which a display is folded to face toward the outside) that includes a first camera module on a front surface and a second camera module and a third camera module on a rear surface, the second camera module and the third camera module may be hidden in a folded state. The outward folding electronic device may additionally require a fourth camera module and a fifth camera module for photography in the folded state.

In another example, in the case of an inward folding electronic device (a type in which a display is folded to face toward the inside) that includes a first camera module on a front surface and a second camera module and a third camera module on a rear surface, the first camera module, the second camera module, and the third camera module may be hidden in a folded state. The inward folding electronic device may additionally require a fourth camera module, a fifth camera module, and a sixth camera module for photography in the folded state.

With an increase in the number of camera modules, the space that the camera modules occupy in the housing may be increased. Therefore, space for other components may be reduced, and the weight of the foldable electronic device may increase.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a foldable electronic device including a camera module that is exposed through a notch formed in a portion of the housing in a folded state.

Additional aspects will be set forth in part in the description which follows and, in part, will be apparent from the description, or may be learned by practice of the presented embodiments.

In accordance with an aspect of the disclosure, a foldable electronic device is provided. The electronic device includes a housing configured to be folded or unfolded by rotation of a first housing or a second housing, the first housing including a notch, a flexible display that is exposed through a first surface of the housing and that includes a first display part mounted in the first housing and a second display part mounted in the second housing, a first camera module mounted in the first housing and exposed through the first surface, the first camera module being disposed adjacent to the notch, and a second camera module and a third camera module mounted in the second housing and exposed through a second surface opposite to the first surface. When the first housing and the second housing are folded, at least one of the second camera module or the third camera module is disposed to face an identical direction as the first camera module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals may be used to refer to identical or similar components.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
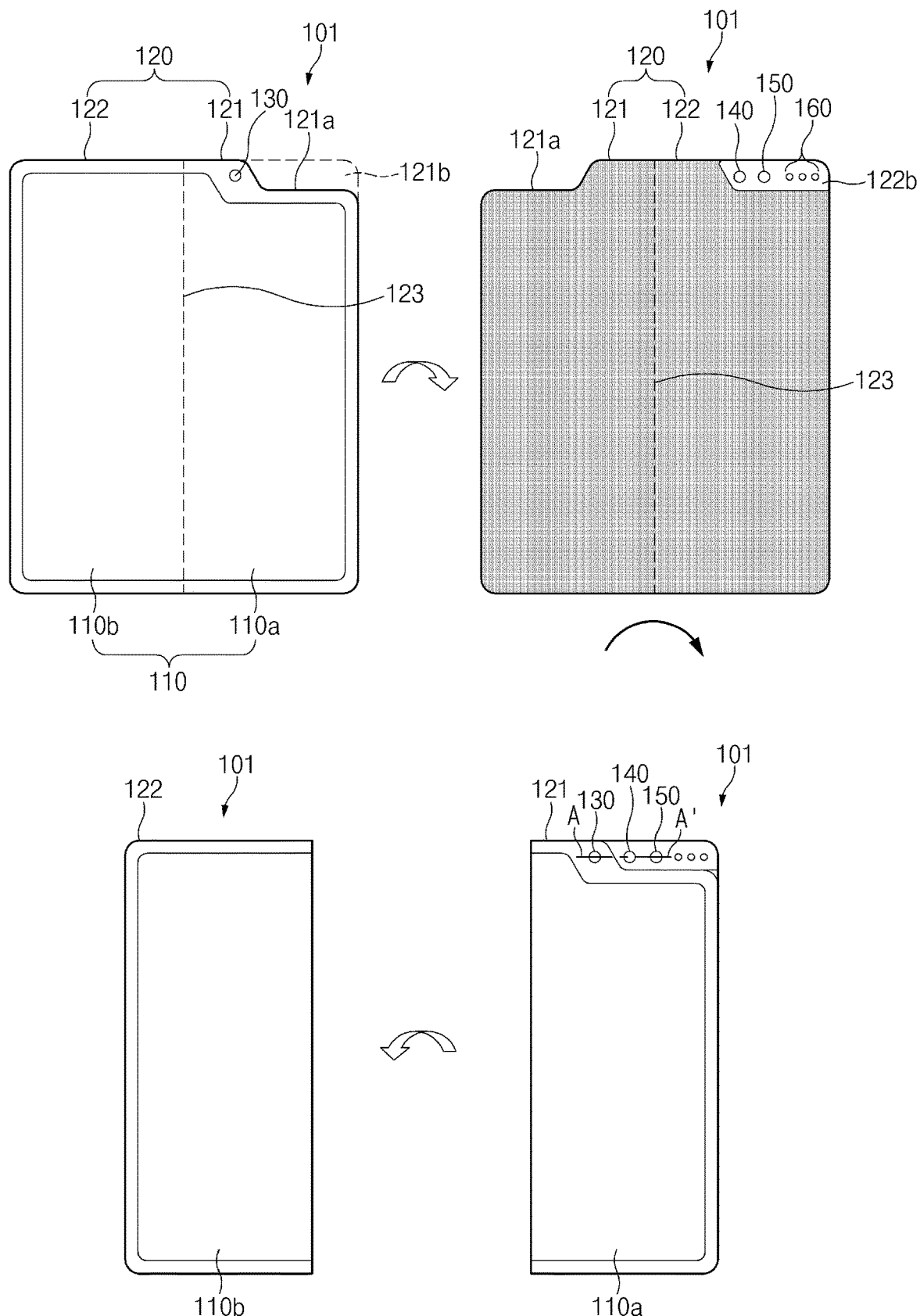
FIG. 1 illustrates a foldable electronic device according to an embodiment of the disclosure.

FIG. 1 illustrates a foldable electronic device according to an embodiment of the disclosure. The following description taken in conjunction with FIG. 1 being related to an outward folding type whereby a flexible screen is exposed when the foldable device is in a folded state and an unfolded state. However, the disclosure is not limited thereto.

Referring to FIG. 1, the foldable electronic device 101 may include a flexible display 110, a housing 120, a first camera module (or a first camera device) 130, a second camera module (or a second camera device) 140, a third camera module (or a third camera device) 150, and/or a sensor 160. The foldable electronic device 101 may be folded about a folding line 123 such that the flexible display 110 faces toward the outside (e.g., outward folding). FIG. 1 illustrates an example that the foldable electronic device 101 includes the first camera module 130, the second camera module 140, and the third camera module 150. However, the disclosure is not limited thereto. For example, the foldable electronic device 101 may further include a fourth camera module that is disposed side by side with the second camera module 140 and the third camera module 150, with the foldable electronic device 101 unfolded.

The flexible display 110 may be folded about the folding line 123 in an outward folding type. The flexible display 110 may include a first display part 110a and a second display part 110b. The first display part 110a and the second display part 110b may display various types of content such as images or text.

The first display part 110a and the second display part 110b may be unfolded depending on rotation of the housing 120 (hereinafter, referred to as the unfolded state). In the unfolded state, the first display part 110a and the second display part 110b may form one plane. In the unfolded state, the first display part 110a and the second display part 110b may display one piece of integrated content (e.g., a web search screen). In another example, the first display part 110a and the second display part 110b may be divided into a plurality of sections and may perform a multi-tasking operation.

The first display part 110a and the second display part 110b may be folded depending on rotation of the housing 120 (hereinafter, referred to as the folded state). In the folded state, the first display part 110a and the second display part 110b may be disposed such that active areas thereof face different directions. In the folded state, the first display part 110a may face a first direction, and the second display part 110b may face a second direction that is opposite to the first direction.

The housing 120 may be folded along the folding line 123. The housing 120 may include a first housing (or a first housing structure) 121 and a second housing (or a second housing structure) 122. According to an embodiment, the housing 120 may include a folding structure (e.g., a hinge structure) in a portion thereof that corresponds to the folding line 123. For example, the first housing 121 and the second housing 122 may be unfolded or folded by rotation of the hinge structure (i.e., the folding structure).

The first housing 121 may have the first display part 110a mounted therein. The first display part 110a may rotate together as the first housing 121 rotates.

According to various embodiments, the first housing 121 may include a notch (or opening) 121a (i.e., a blank region that prevents the first housing 121 from having an identical shape as a corresponding second housing, which may also be referred to as a cutting structure or a cutting area) For example, as illustrated in FIG. 1, a small portion that is substantially square is removed to form the notch 121a having an L-cut structure or a through-opening structure. However, the notch 121a may have any suitable shape. For example, the notch 121a may be a structure in which a portion of a rectangular vertex area of the first housing 121 is removed. The first display part 110a may have an "L" shape in an area adjacent to the notch 121a.

FIG. 1 illustrates an example that the notch 121a is located on an upper right side of the first housing 121. However, the disclosure is not limited thereto. For example, the notch 121a may be located on an upper left side of the second housing 122.

The second housing 122 may have the second display part 110b mounted therein. The second display part 110b may rotate together as the second housing 122 rotates.

The foldable electronic device 101 may include various components on the exterior or in the interior of the housing 120. For example, the foldable electronic device 101 may include the plurality of camera modules 130, 140, and 150, the sensor 160, buttons (e.g., a power button and a volume button), a speaker, and a receiver, which are at least partially exposed to the outside. Furthermore, the foldable electronic device 101 may include, inside the housing 120, a component such as a processor, a memory, a battery, a printed circuit board, or communication circuitry.

The housing 120 may have the first camera module 130 mounted on a first surface (e.g., a front surface) on which the flexible display 110 is exposed. The first camera module 130 may be disposed to face the same direction as the flexible display 110 in the unfolded state. The first camera module 130 may be disposed to face the same direction as the first display part 110a in the folded state.

The housing 120 may have the second camera module 140 and the third camera module 150 mounted on a second surface (a surface on which the flexible display 110 is not exposed) (e.g., a rear surface) that is opposite to the first surface. In the unfolded state, the first camera module 130 may face a different direction from the second camera module 140 and the third camera module 150. The second camera module 140 and the third camera module 150 may be mounted in a first portion 122b of the second housing 122 corresponding to a removal area 121b. In an embodiment, the first portion 122b may be an area that further protrudes upward beyond the remaining area of the second housing 122.

In the folded state, the second camera module 140 and the third camera module 150 may face the same direction as the first camera module 130. The second camera module 140 and the third camera module 150 may be disposed (e.g., on an upper right side) so as to be exposed through the removal area 121b near the notch 121a in the folded state.

In the folded state, the first camera module 130, the second camera module 140, and the third camera module 150 may all face the same direction. In an embodiment, the first camera module 130, the second camera module 140, and the third camera module 150 may be disposed in a row on the same one axis (e.g., A-A').

According to various embodiments, the first camera module 130, the second camera module 140, and the third camera module 150 may be different types of cameras. For example, the first camera module 130 may include a super-wide lens, the second camera module 140 may include a tele lens, and the third camera module 150 may include a wide lens.

Figure 4:
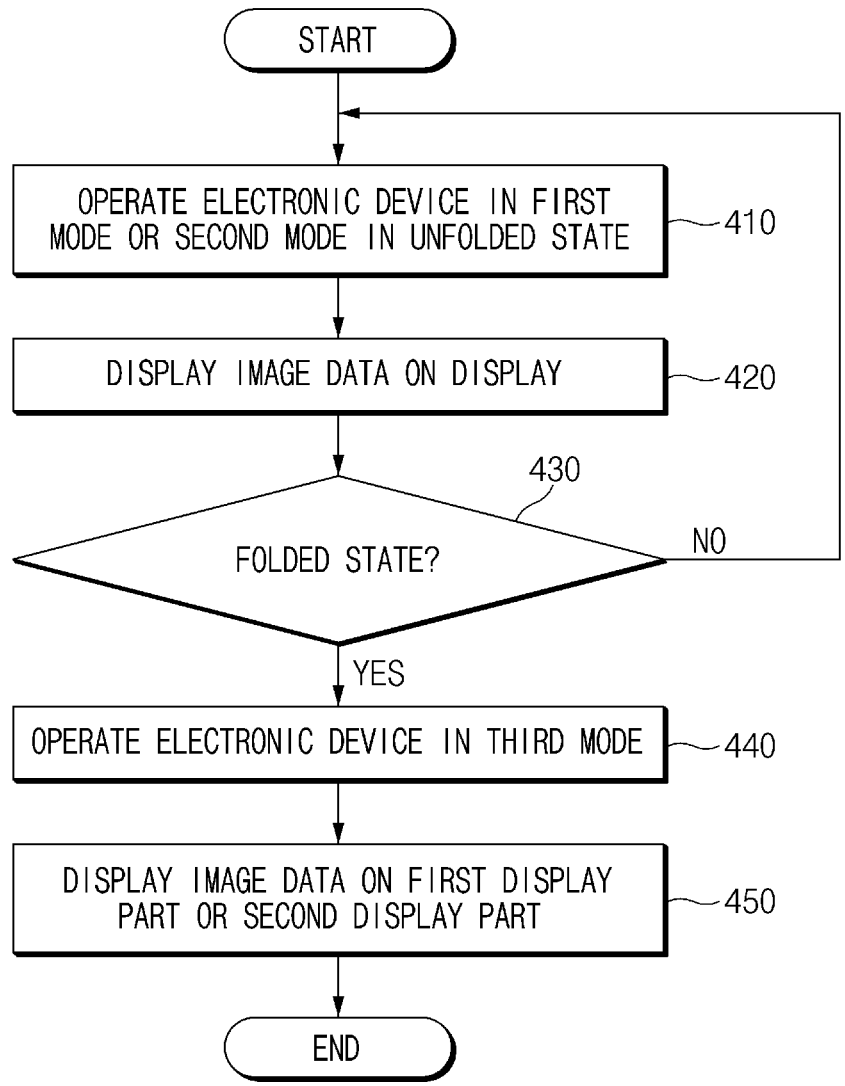
FIG. 4 is a flowchart illustrating a method of taking an image when a foldable electronic device is changed from an unfolded state to a folded state according to an embodiment of the disclosure.
Figure 5:
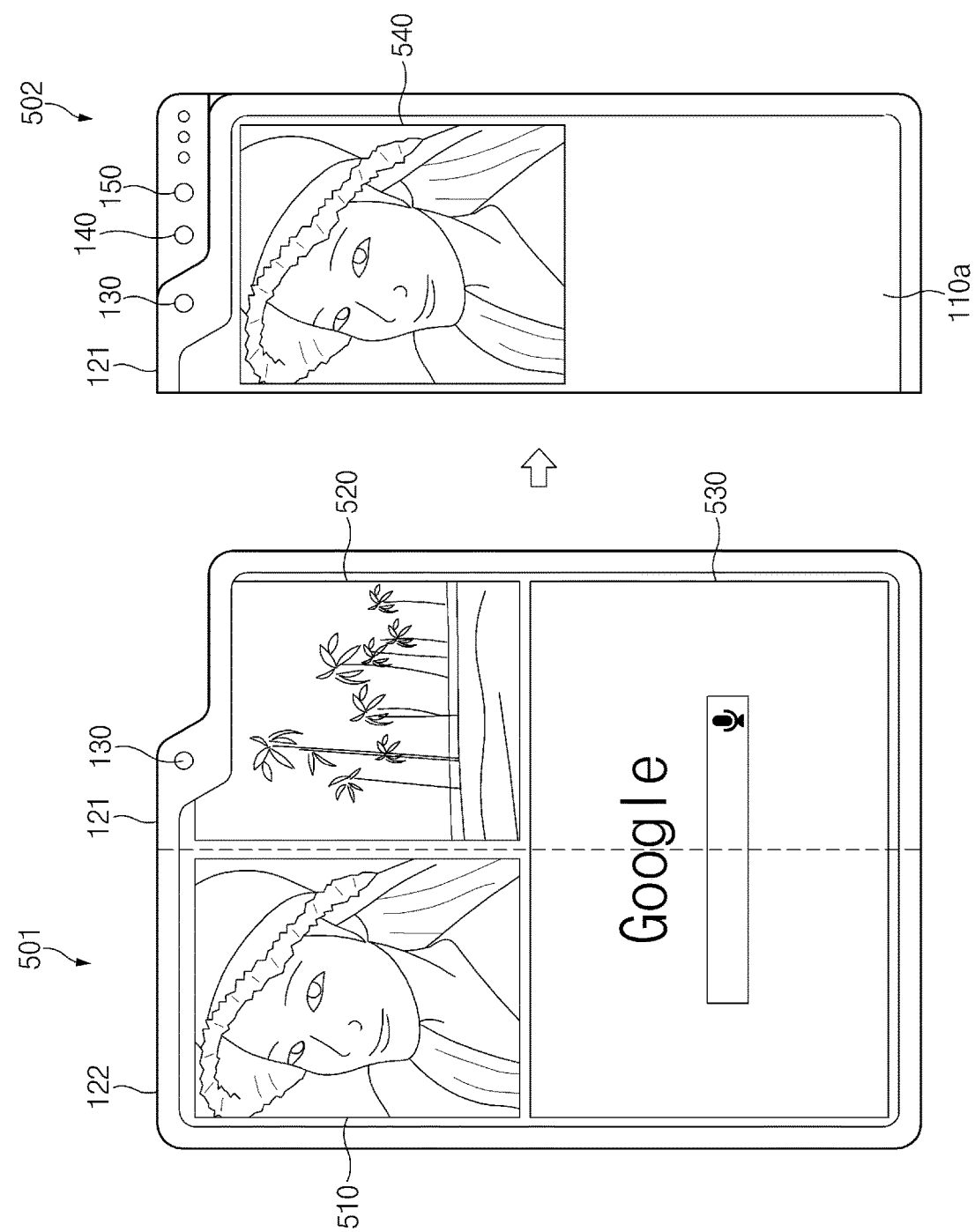
FIG. 5 is a view illustrating a screen in an unfolded state or a folded state according to an embodiment of the disclosure.

The processor in the foldable electronic device 101 may collect image data by controlling the first camera module 130, the second camera module 140, and the third camera module 150 in various ways depending on the unfolded state or the folded state (refer to FIGS. 4 and 5).

For example, in the unfolded state, the processor may take a selfie, or may perform a video call, by using the first camera module 130. In another example, the processor may take a composite image or a bokeh image using the second camera module 140 and the third camera module 150.

In another example, in the folded state, the processor may take a high-quality composite image or bokeh image by simultaneously using the first camera module 130, the second camera module 140, and/or the third camera module 150.

According to various embodiments, the second housing 122 may have the sensor 160 mounted in the first portion 122b (e.g., on the upper right side). The sensor 160 may sense various pieces of information around the foldable electronic device 101. FIG. 1 illustrates an example that the sensor 160 is mounted in the first portion 122b (e.g., on the upper right side). However, the disclosure is not limited thereto. For example, the sensor 160 may be disposed on the periphery of a first surface of the second housing 122 (a surface toward which the flexible display 110 faces).

FIG. 1 illustrates an example that the foldable electronic device 101 is folded in the outward folding type in which the first display part 110a and the second display part 110b of the flexible display 110 are exposed to the outside. However, the disclosure is not limited thereto. For example, the foldable electronic device 101 may be folded in an inward folding type in which the first display part 110a and the second display part 110b face each other (refer to FIG. 8).

Figure 2:
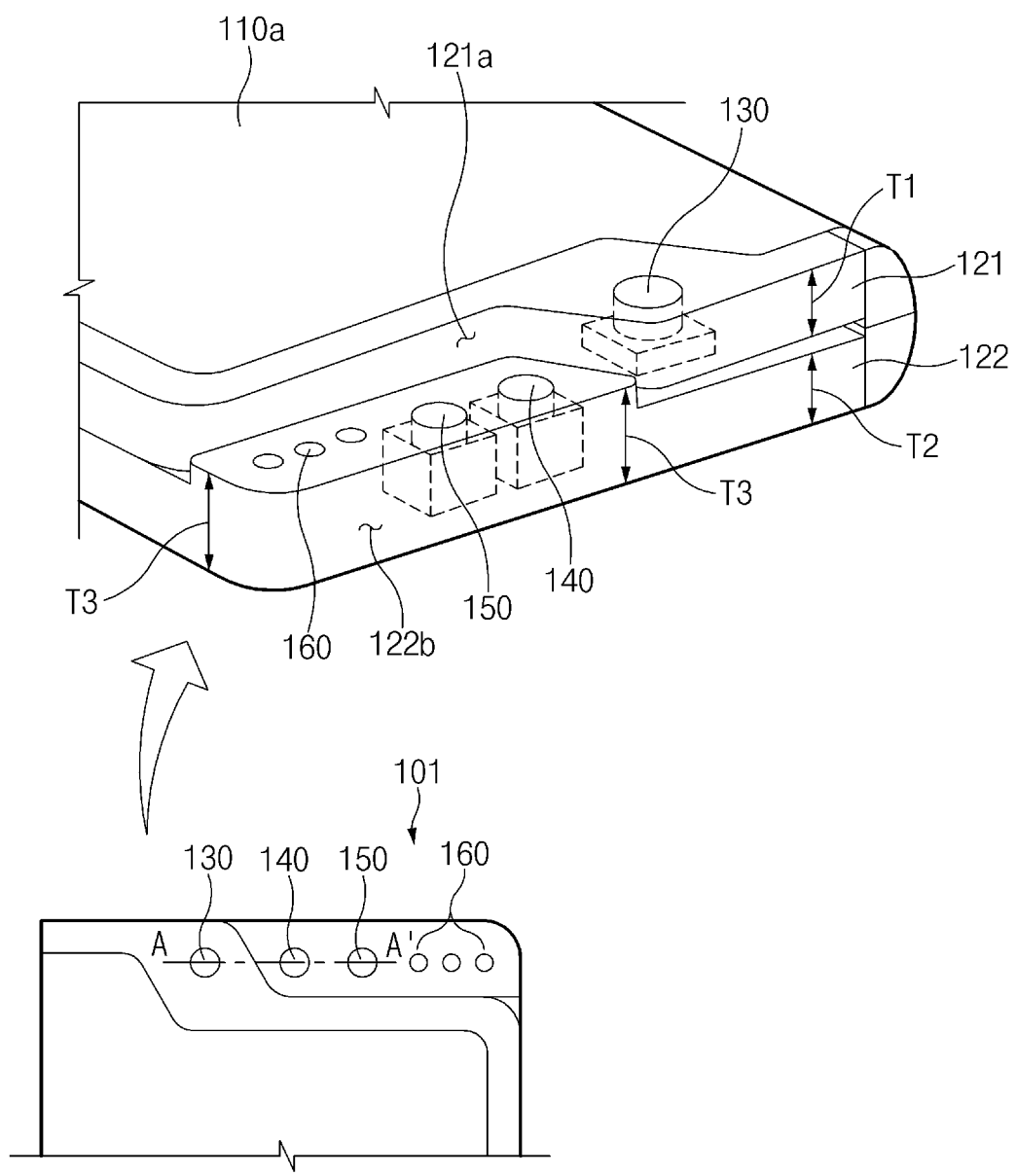
FIG. 2 illustrates camera modules in a folded state of the foldable electronic device of FIG. 1 according to an embodiment of the disclosure.

FIG. 2 illustrates camera modules in a folded state of the foldable electronic device of FIG. 1 according to an embodiment of the disclosure.

Referring to FIG. 2, the foldable electronic device 101 may include the first camera module 130, the second camera module 140, and/or the third camera module 150. For example, the first camera module 130 may be mounted in the first housing 121. The second camera module 140 and the third camera module 150 may be mounted in the second housing 122.

In the folded state, the second camera module 140 and the third camera module 150 may be exposed through the notch 121a. According to an embodiment, In the folded state, the first camera module 130, the second camera module 140, and the third camera module 150 may be disposed in a row on the virtual axis A-A'. For example, the virtual axis A-A' may be an axis parallel to an upper edge of the foldable electronic device 101.

According to various embodiments, the second camera module 140 and the third camera module 150 may be elements or modules that are thicker than the first camera module 130.

The first housing 121 may have a first thickness T1. The second housing 122 may have a second thickness T2 in the remaining area other than the first portion (or the protruding area) 122b. The first thickness T1 may be equal to the second thickness T2. The first portion (or the protruding area) 122b of the second housing 122 may have a third thickness T3 greater than the second thickness T2.

The first camera module 130 may have a thickness by which the first camera module 130 is able to be mounted in the first housing 121 having the first thickness T1. The second camera module 140 and the third camera module 150 may have a thickness by which the second camera module 140 and the third camera module 150 are able to be mounted in the first portion 122b having the third thickness T3.

According to various embodiments, various elements that are difficult to mount in the portion having the second thickness T2 may be mounted in the first portion (or the protruding area) 122b.

The first portion (or the protruding area) 122b of the second housing 122 may have a shape corresponding to the notch 121a so as to be brought into contact with, or formed within a specified distance from, the notch 121a of the first housing 121 in the folded state.

Figure 3:
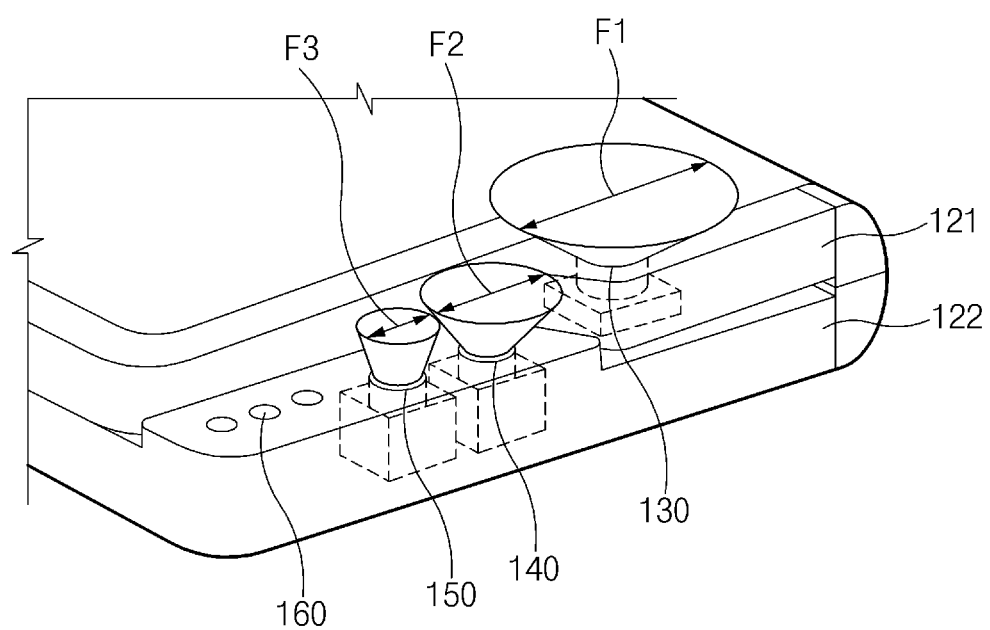
FIG. 3 illustrates viewing angles of first to third camera modules according to an embodiment of the disclosure.

FIG. 3 illustrates viewing angles of first to third camera modules according to an embodiment of the disclosure. FIG. 3 is illustrative, and the disclosure is not limited thereto.

Referring to FIG. 3, the foldable electronic device 101 may include the first camera module 130, the second camera module 140, and/or the third camera module 150. For example, the first camera module 130 may be mounted in the first housing 121. The second camera module 140 and the third camera module 150 may be mounted in the second housing 122. The first, second, and third camera modules 130, 140, and 150 may be disposed to face the same direction in the folded state.

According to an embodiment, the first camera module 130, the second camera module 140, and the third camera module 150 may have different viewing angles. The first, second, and third camera modules 130, 140, and 150 may have a first viewing angle F1, a second viewing angle F2, and a third viewing angle F3, respectively. For example, the first viewing angle F1, the second viewing angle F2, and the third viewing angle F3 may have the relation F1>F2>F3.

The foldable electronic device 101 may take a photo or video having various image effects by various combinations of the first, second, and third camera modules 130, 140, and 150.

For example, the foldable electronic device 101 may take an image of the same object by using all of the first, second, and third camera modules 130, 140, and 150. The foldable electronic device 101 may generate one combined image by comparing and combining the first, second, and third camera modules 130, 140, and 150.

In another example, the foldable electronic device 101 may use the first camera module 130 and the third camera module 150 to generate a combined image having a different image effect from that when the second camera module 140 and the third camera module 150 are used.

FIG. 4 is a flowchart illustrating a method of taking an image when a foldable electronic device is changed from an unfolded state to a folded state according to an embodiment of the disclosure.

Referring to FIG. 4, in operation 410, in an unfolded state, the foldable electronic device 101 (or the processor in the foldable electronic device 101) may operate in a first mode (e.g., a selfie mode) using the first camera module 130 or in a second mode (e.g., a background photographing mode) using the second camera module 140 and the third camera module 150.

In operation 420, in the unfolded state, the foldable electronic device 101 may display, through at least part of the flexible display 110, image data collected depending on the first mode or the second mode.

For example, in the first mode, the foldable electronic device 101 may collect image data through the first camera module 130. The foldable electronic device 101 may display a preview image through at least part (e.g., the second display part 110b) of the flexible display 110, or the entire flexible display 110, by using the collected image data. A user may take a selfie image while identifying the preview image displayed.

In another example, in the second mode, the foldable electronic device 101 may collect image data through the second camera module 140 and the third camera module 150. The foldable electronic device 101 may display a preview image through at least part (e.g., the first display part 110a) of the flexible display 110, or the entire flexible display 110, by using the collected image data. The user may take an image of a surrounding object while identifying the preview image displayed. In the second mode, the foldable electronic device 101 may take an image with higher quality than in the first mode and may take an image (e.g., a bokeh image) that have various effects, by simultaneously using the different types of camera modules.

In operation 430, the foldable electronic device 101 may determine whether the first housing 121 and the second housing 122 are changed into a folded state. For example, the foldable electronic device 101 may include a sensor (e.g., a magnet and a Hall sensor) for recognizing the folded state of the first housing 121 and the second housing 122. The foldable electronic device 101 may detect whether the first housing 121 and the second housing 122 are changed into the folded state, based on information recognized by the sensor.

In operation 440, when the first housing 121 and the second housing 122 are changed from the unfolded state to the folded state, the foldable electronic device 101 may operate in a third mode in which at least two of the first camera module 130, the second camera module 140, and the third camera module 150 are combined and used.

According to an embodiment, in the folded state, the foldable electronic device 101 may collect image data using all of the first camera module 130, the second camera module 140, and the third camera module 150. The first camera module 130, the second camera module 140, and the third camera module 150 may have different characteristics and may collect different image data on the same subject at the same time. The foldable electronic device 101 may compare and combine the image data collected by the camera modules 130, 140, and 150 and may generate a combined image to which various image effects are applied.

According to another embodiment, in the folded state, the foldable electronic device 101 may collect image data using the first camera module 130 and the second camera module 140. When the first camera module 130 and the second camera module 140 are simultaneously used, the foldable electronic device 101 may collect image data different from that when the second camera module 140 and the third camera module 150 are used, and may apply various image effects.

According to another embodiment, in the folded state, the foldable electronic device 101 may collect image data using the first camera module 130 and the third camera module 150. When the first camera module 130 and the third camera module 150 are simultaneously used, the foldable electronic device 101 may collect image data different from that when the first camera module 130 and the second camera module 140 or the second camera module 140 and the third camera module 150 are used, and the foldable electronic device 101 may apply various image effects.

In operation 450, in the third mode, the foldable electronic device 101 may display, through at least one of the first display part 110a or the second display part 110b, the image data collected by the combination of at least two of the first camera module 130, the second camera module 140, and the third camera module 150.

For example, when changed from the unfolded state to the folded state, the foldable electronic device 101 may display a preview image through the first display part 110a according to default settings, and the second display part 110b may remain in a screen-off state. When a separate user input (e.g., a touch input for switching a screen) is made, the foldable electronic device 101 may display the preview image through the second display part 110b, and the first display part 110a may be switched to a screen-off state.

According to various embodiments, the foldable electronic device 101, while operating in the folded state, may determine whether the foldable electronic device 101 is changed into an unfolded state. In this case, the foldable electronic device 101 in operation in the third mode may transition to the first mode or the second mode. For example, when changed from the folded state to the unfolded state, the foldable electronic device 101 may operate in the first mode according to the default settings, and when a separate user input is made, the foldable electronic device 101 may transition to the second mode.

FIG. 5 is a view illustrating a screen in an unfolded state or a folded state according to an embodiment of the disclosure. FIG. 5 is illustrative, and the disclosure is not limited thereto.

Referring to FIG. 5, in an unfolded state 501, the foldable electronic device 101 may operate in the first mode or the second mode.

For example, in the first mode, the foldable electronic device 101 may collect image data using the first camera module 130. The foldable electronic device 101 may display a preview image through a first area 510 (e.g., an upper area of the second display part 110b) of the flexible display 110. In another example, unlike in FIG. 5, the foldable electronic device 101 may display the preview image through the entire flexible display 110.

In another example, in the second mode, the foldable electronic device 101 may collect image data using the second camera module 140 and the third camera module 150. The foldable electronic device 101 may display a preview image through a second area 520 (e.g., an upper area of the first display part 110a) of the flexible display 110. In another example, unlike in FIG. 5, the foldable electronic device 101 may display the preview image through the entire flexible display 110.

In another example, the foldable electronic device 101 may simultaneously operate in the first mode and the second mode. The foldable electronic device 101 may display a preview image using the first camera module 130 through the first area 510 of the flexible display 110 while displaying a preview image using the second camera module 140 and the third camera module 150 through the second area 520 of the flexible display 110. In another example, unlike in FIG. 5, the foldable electronic device 101 may display, through the entire flexible display 110, an image obtained by combining an object image using the first camera module 130 and a background image using the second camera module 140 and the third camera module 150.

According to various embodiments, while operating in the first or third mode, the foldable electronic device 101 may display a separate application execution screen on a third area 530.

In a folded state 502, the foldable electronic device 101 may operate in the third mode. In the third mode, the foldable electronic device 101 may combine and operate at least two of the first camera module 130, the second camera module 140, and the third camera module 150.

For example, the foldable electronic device 101 may collect image data using all of the first camera module 130, the second camera module 140, and the third camera module 150. In another example, the foldable electronic device 101 may collect image data using the first camera module 130 and the second camera module 140, or may collect image data using the first camera module 130 and the third camera module 150.

The foldable electronic device 101 may display the collected image data through a fourth area 540 of the first display part 110a.

For example, while identifying a preview screen through the fourth area 540, a user may take a high-quality image using the three camera modules, or an image (e.g., a bokeh image) to which various effects are applied.

In an embodiment, when a separate user input (e.g., a touch input for switching a screen) is made, the foldable electronic device 101 may display the preview image through the second display part 110b, and the first display part 110a may be switched to a screen-off state.

Figure 6:
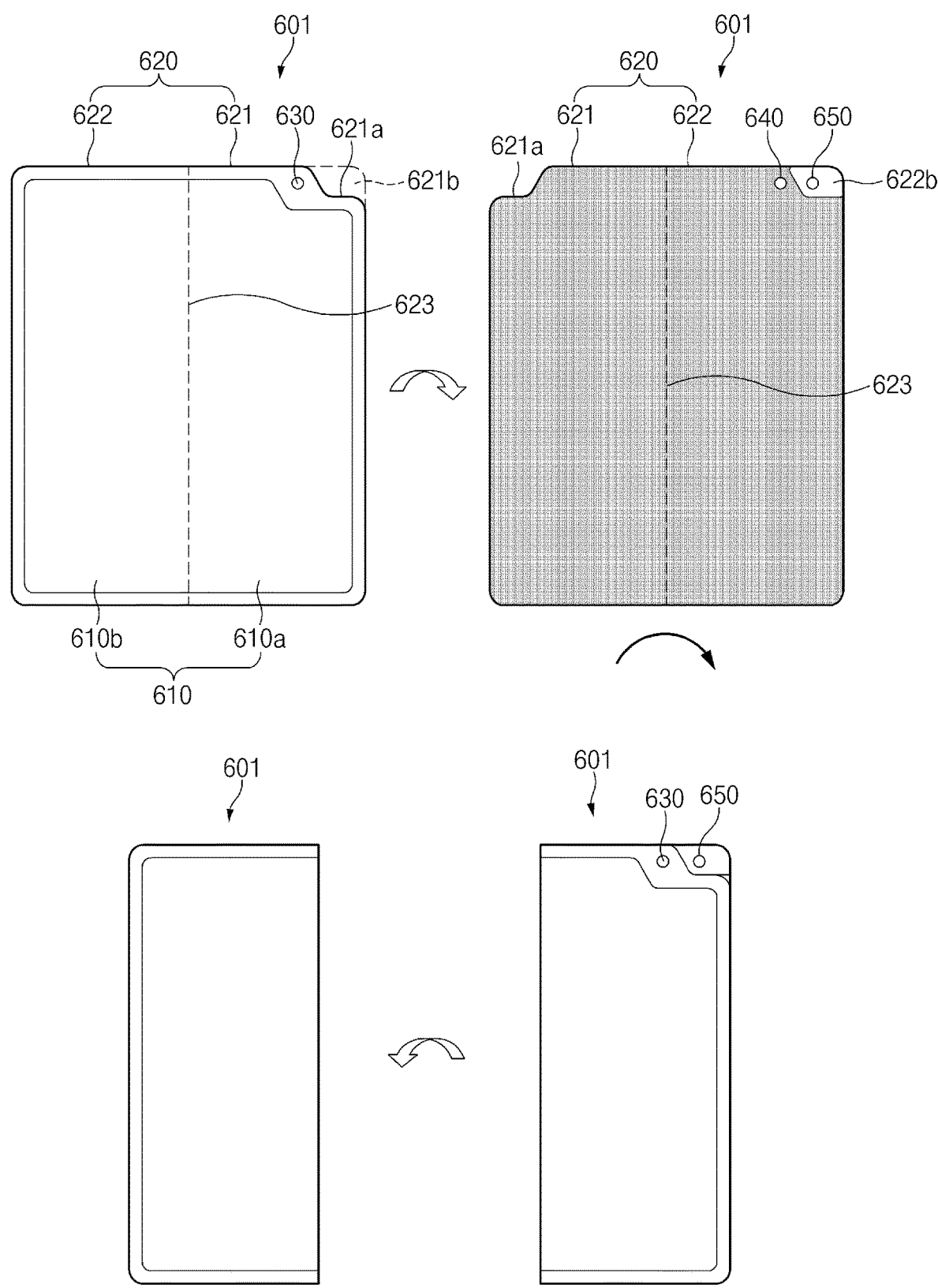
FIG. 6 illustrates a foldable electronic device in which camera modules overlap each other in a folded state according to an embodiment of the disclosure.

FIG. 6 illustrates a foldable electronic device in which camera modules overlap each other in a folded state according to an embodiment of the disclosure.

Referring to FIG. 6, the foldable electronic device 601 may include a flexible display 610, a housing 620, a first camera module 630, a second camera module 640, and a third camera module 650. The foldable electronic device 601 may be folded about a folding line 623 such that the flexible display 610 faces toward the outside (outward folding).

FIG. 6 illustrates an example that the foldable electronic device 601 includes the first camera module 630, the second camera module 640, and the third camera module 650. However, the disclosure is not limited thereto.

The flexible display 610 may be folded about the folding line 623 in an outward folding type. The flexible display 610 may include a first display part 610a and a second display part 610b.

The first display part 610a and the second display part 610b may be unfolded depending on rotation of the housing 620. In the unfolded state, the first display part 610a and the second display part 610b may form one plane.

The first display part 610a and the second display part 610b may be folded depending on rotation of the housing 620. In the folded state, the first display part 610a and the second display part 610b may be disposed such that active areas thereof face different directions. In the folded state, the first display part 610a may face a first direction, and the second display part 610b may face a second direction that is opposite to the first direction.

The housing 620 may be folded about the folding line 623. The housing 620 may include a first housing 621 and a second housing 622. The first housing 621 may have the first display part 610a mounted therein. The first display part 610a may rotate together as the first housing 621 rotates.

According to various embodiments, the first housing 621 may include a notch 621a. The notch 621a may be a structure in which a portion of a rectangular vertex area of the first housing 621 is removed. The first display part 610a may have an "L" shape in an area adjacent to the notch 621a.

FIG. 6 illustrates an example that the notch 621a is located on an upper right side of the first housing 621. However, the disclosure is not limited thereto. For example, the notch 621a may be located on an upper left side of the second housing 622.

The second housing 622 may have the second display part 610b mounted therein. The second display part 610b may rotate together as the second housing 622 rotates.

The housing 620 may have the first camera module 630 mounted on a first surface (e.g., a front surface) on which the flexible display 610 is exposed. In the unfolded state, the first camera module 630 may be disposed to face the same direction as the flexible display 610. In the folded state, the first camera module 630 may be disposed to face the same direction as the first display part 610a.

The housing 620 may have the second camera module 640 and the third camera module 650 mounted on a second surface (a surface on which the flexible display 610 is not exposed) (e.g., a rear surface) that is opposite to the first surface. In the unfolded state, the first camera module 630 may face a different direction from the second camera module 640 and the third camera module 650.

According to an embodiment, the third camera module 650 may be mounted in a first portion 622b of the second housing 622 corresponding to a removal area 621b. For example, the first portion 622b may be an area that further protrudes upward beyond the remaining area of the second housing 622. In an embodiment, the second camera module 640 may be disposed in an area rather than the first portion 622b.

In the folded state, the third camera module 650 may face the same direction as the first camera module 630. In contrast, the second camera module 640 may be hidden by the first housing 621.

In the folded state, the third camera module 650 may be disposed (e.g., on an upper right side) so as to be exposed through the removal area 621b near the notch 621a.

In the folded state, the first camera module 630 and the third camera module 650 may face the same direction. In an embodiment, the first camera module 630 and the third camera module 650 may be disposed in a row on the same one axis. The second camera module 640 may be hidden by the first housing 621.

According to various embodiments, the first camera module 630 and the third camera module 650 may be different types of cameras. For example, the first camera module 630 may include a super-wide lens, and the third camera module 650 may include a tele lens.

A processor in the foldable electronic device 601 may collect image data by controlling the first camera module 630, the second camera module 640, and the third camera module 650 in various ways depending on the unfolded state or the folded state.

For example, in the unfolded state, the processor may take a selfie, or may perform a video call, by using the first camera module 630. In another example, the processor may take a composite image or a bokeh image by using the second camera module 640 and the third camera module 650.

In another example, in the folded state, the processor may take a high-quality composite image or bokeh image by simultaneously using the first camera module 630 and the third camera module 650.

FIG. 6 illustrates an example that the foldable electronic device 601 is folded in the outward folding type in which the first display part 610*a* and the second display part 610*b* of the flexible display 610 are exposed to the outside. However, the disclosure is not limited thereto. For example, the foldable electronic device 601 may be folded in an inward folding type in which the first display part 610*a* and the second display part 610*b* face each other.

Figure 7:
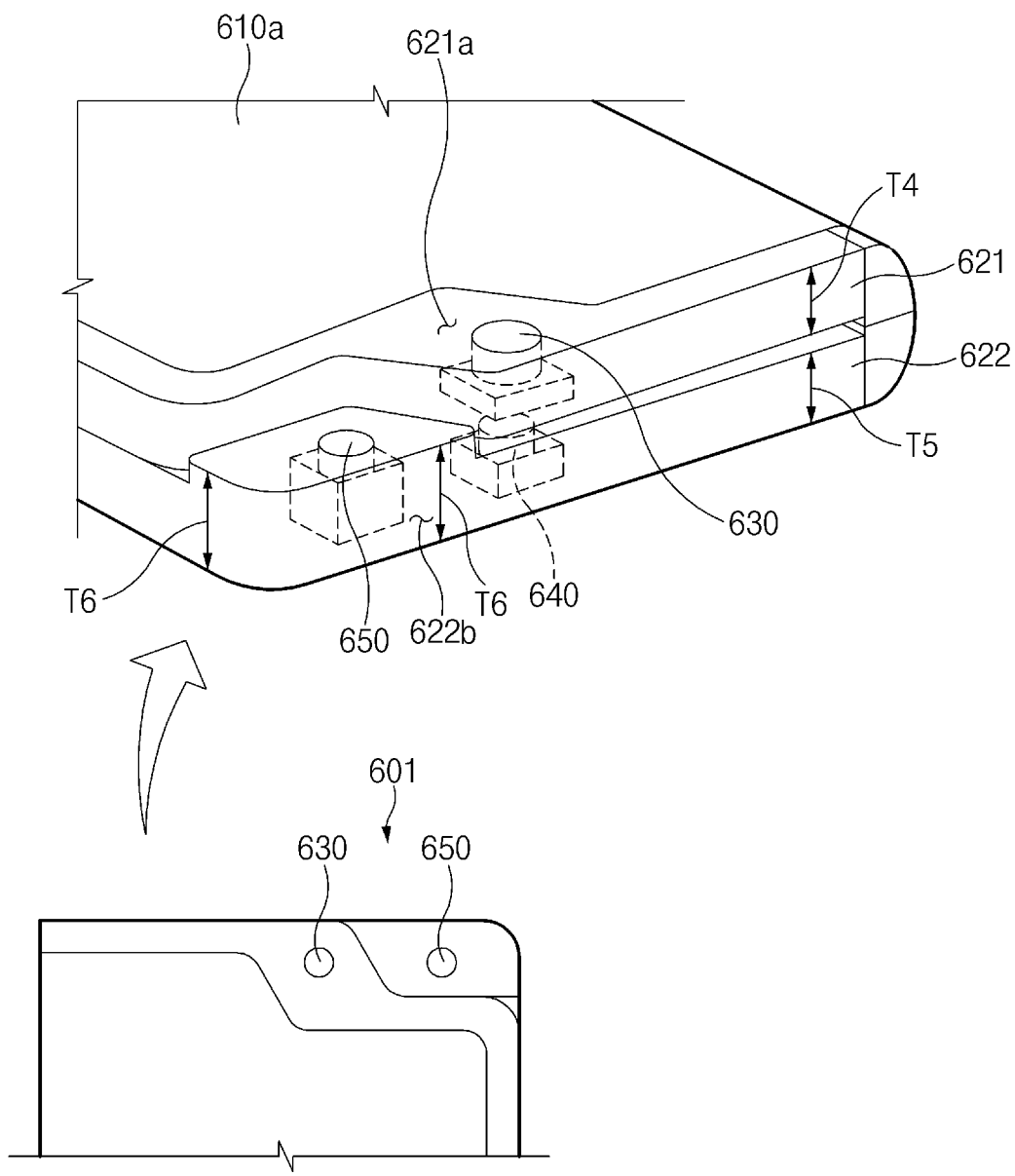
FIG. 7 illustrates camera modules in a folded state of the foldable electronic device of FIG. 6 according to an embodiment of the disclosure.

FIG. 7 illustrates camera modules in a folded state of the foldable electronic device of FIG. 6 according to an embodiment of the disclosure.

Referring to FIG. 7, a foldable electronic device 601 may include the first camera module 630, the second camera module 640, and the third camera module 650. The first camera module 630 may be mounted in the first housing 621. The second camera module 640 and the third camera module 650 may be mounted in the second housing 622.

In the folded state, the third camera module 650 may be exposed through the notch 621*a*. The second camera module 640 may be hidden by the first housing 621.

According to various embodiments, the third camera module 650 may be an element or a module that is thicker than the first camera module 630 and the second camera module 640.

The first housing 621 may have a fourth thickness T4. The second housing 622 may have a fifth thickness T5 in the remaining area other than the first portion (or the protruding area) 622*b*. For example, the fourth thickness T4 may be equal to the fifth thickness T5. The first portion (or the protruding area) 622*b* of the second housing 622 may have a sixth thickness T6 greater than the fifth thickness T5.

The first camera module 630 may have a thickness by which the first camera module 630 is able to be mounted in the first housing 621 having the fourth thickness T4. The second camera module 640 may have a thickness by which the second camera module 640 is able to be mounted in the second housing 622 having the fifth thickness T5. The third camera module 650 may have a thickness by which the third camera module 650 is able to be mounted in the first portion 622*b* having the sixth thickness T6.

According to various embodiments, various elements that are difficult to mount in the portion having the fifth thickness T5 may be mounted in the first portion (or the protruding area) 622*b*.

The first portion (or the protruding area) 622*b* of the second housing 622 may have a shape corresponding to the notch 621*a* so as to be brought into contact with, or formed within a specified distance from, the notch 621*a* of the first housing 621 in the folded state.

Figure 8:
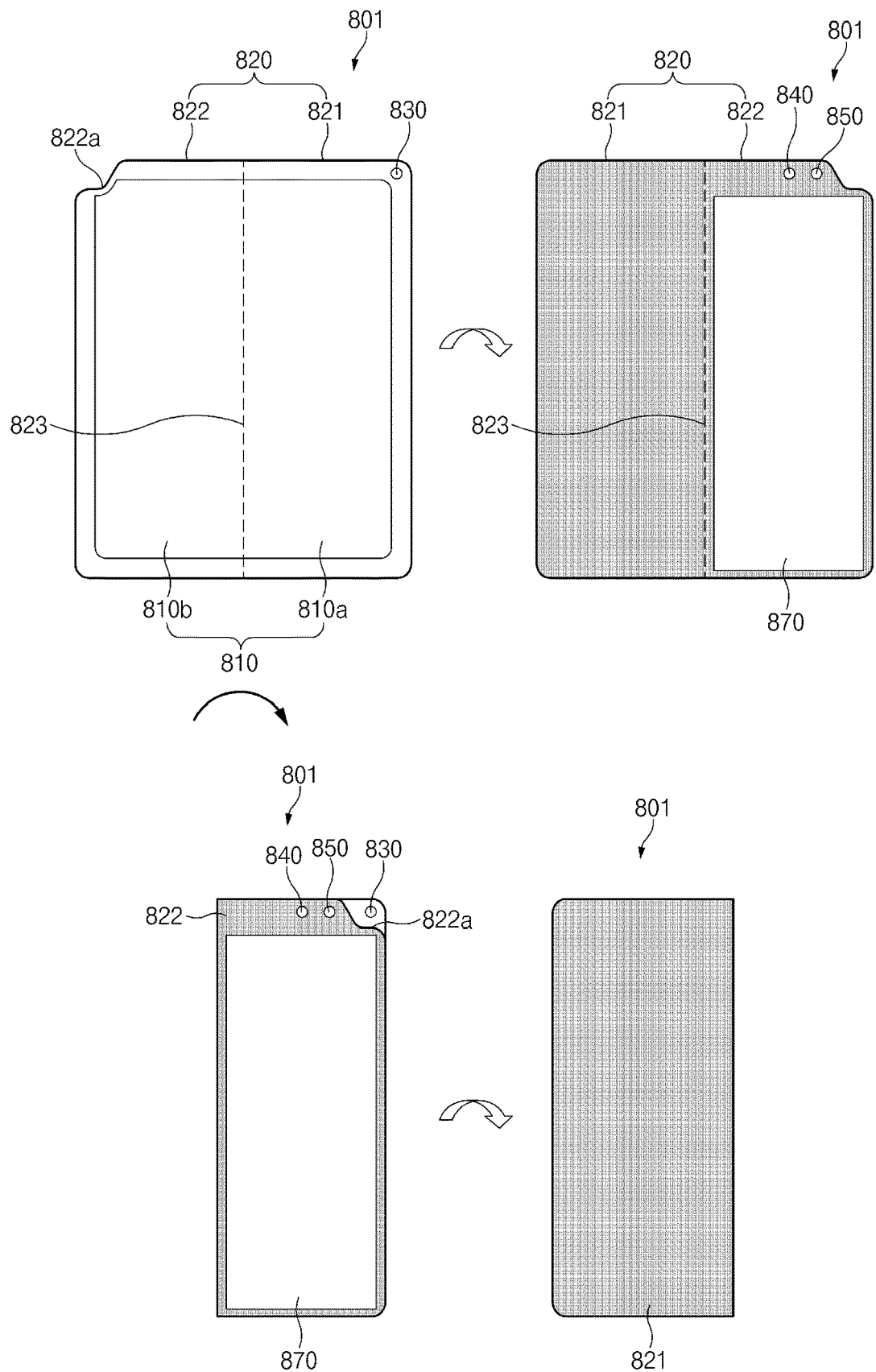
FIG. 8 illustrates an inward folding electronic device according to an embodiment of the disclosure.

FIG. 8 illustrates an inward folding electronic device according to an embodiment of the disclosure.

Referring to FIG. 8, the foldable electronic device 801 may include a flexible display 810, a housing 820, a first camera module 830, a second camera module 840, a third camera module 850, and a sub-display 870 that is exposed while the device is both folded and unfolded. The foldable electronic device 801 may be folded about a folding line 823 such that the flexible display 810 faces toward the inside (i.e., inward folding). FIG. 8 illustrates an example that the foldable electronic device 801 includes the first camera module 830, the second camera module 840, and the third camera module 850. However, the disclosure is not limited thereto. For example, the foldable electronic device 801 may further include a fourth camera module that is disposed side by side with the second camera module 840 and the third camera module 850, with the foldable electronic device 801 unfolded.

The flexible display 810 may be folded about the folding line 823 to conceal and protect the flexible display 810. The flexible display 810 may include a first display part 810*a* and a second display part 810*b*.

The first display part 810*a* and the second display part 810*b* may be unfolded depending on rotation direction of the housing 820. In the unfolded state, the first display part 810*a* and the second display part 810*b* may form one plane. In the unfolded state, the first display part 810*a* and the second display part 810*b* may display one piece of integrated content (e.g., a web search screen). In another example, the first display part 810*a* and the second display part 810*b* may be divided into a plurality of sections and may perform multi-tasking operations.

The first display part 810*a* and the second display part 810*b* may be folded depending on rotation of the housing 820. In the folded state, the first display part 810*a* and the second display part 810*b* may be folded to face each other. In the folded state, the first display part 810*a* and the second display part 810*b* may be in a screen-off state.

The housing 820 may be folded about the folding line 823. The housing 820 may include a first housing 821 and a second housing 822. According to an embodiment, the housing 820 may include a folding structure (e.g., a hinge) in a portion thereof that corresponds to the folding line 823. For example, the first housing 821 and the second housing 822 may be unfolded or folded by rotation of the hinge (i.e., the folding structure).

The first housing 821 may have the first display part 810*a* mounted therein. The first display part 810*a* may rotate together as the first housing 821 rotates.

The second housing 822 may have the second display part 810*b* mounted therein. The second display part 810*b* may rotate together as the second housing 822 rotates.

According to various embodiments, the second housing 822 may include a notch 822*a* (e.g., an L-cut structure). The notch 822*a* may be a structure in which a portion of a rectangular vertex area of the second housing 822 is removed. The second display part 810*b* may have an "L" shape in an area adjacent to the notch 822*a*.

FIG. 8 illustrates an example that the notch 822a is located on an upper left side of the second housing 822. However, the disclosure is not limited thereto. For example, the notch 822a may be located on an upper right side of the first housing 821. In this case, the first camera module 830 may be disposed in the first housing 821, and the second camera module 840, the third camera module 850, or the sub-display 870 may be disposed in the second housing 822.

The housing 820 may have the first camera module 830 mounted on a first surface (e.g., a front surface) on which the flexible display 810 is exposed. In the unfolded state, the first camera module 830 may be disposed to face the same direction as the flexible display 810. In the folded state, the first camera module 830 may be exposed to the outside through the notch 822a.

The housing 820 may have the second camera module 840 and the third camera module 850 mounted on a second surface (a surface on which the flexible display 810 is not exposed) (e.g., a rear surface) that is opposite to the first surface. In the unfolded state, the first camera module 830 may face a different direction from the second camera module 840 and the third camera module 850.

In the folded state, the second camera module 840 and the third camera module 850 may face the same direction as the first camera module 830. In the folded state, the first camera module 830 may be disposed (e.g., on an upper right side) so as to be exposed through the notch 822a.

In the folded state, the first camera module 830, the second camera module 840, and the third camera module 850 may all face the same direction. In an embodiment, the first camera module 830, the second camera module 840, and the third camera module 850 may be disposed in a row on the same one axis.

According to various embodiments, the first camera module 830, the second camera module 840, and the third camera module 850 may be different types of cameras. For example, the first camera module 830 may include a super-wide lens, the second camera module 840 may include a tele lens, and the third camera module 850 may include a wide lens.

A processor in the foldable electronic device 801 may collect image data by controlling the first camera module 830, the second camera module 840, and the third camera module 850 in various ways depending on the unfolded state or the folded state.

For example, in the unfolded state, the processor may take a selfie, or may perform a video call, by using the first camera module 830. In another example, the processor may take a composite image or a bokeh image by using the second camera module 840 and the third camera module 850.

In another example, in the folded state, the processor may take a high-quality composite image or bokeh image by simultaneously using the first camera module 830, the second camera module 840, and the third camera module 850.

The sub-display 870 may be mounted on a second surface (a surface on which the flexible display 810 is not exposed) (e.g., a rear surface) of the second housing 822. In an embodiment, in the unfolded state, the sub-display 870 may be in a screen-off state. In the folded state, the sub-display 870 may display content, or may receive an input of a user.

Figure 9:
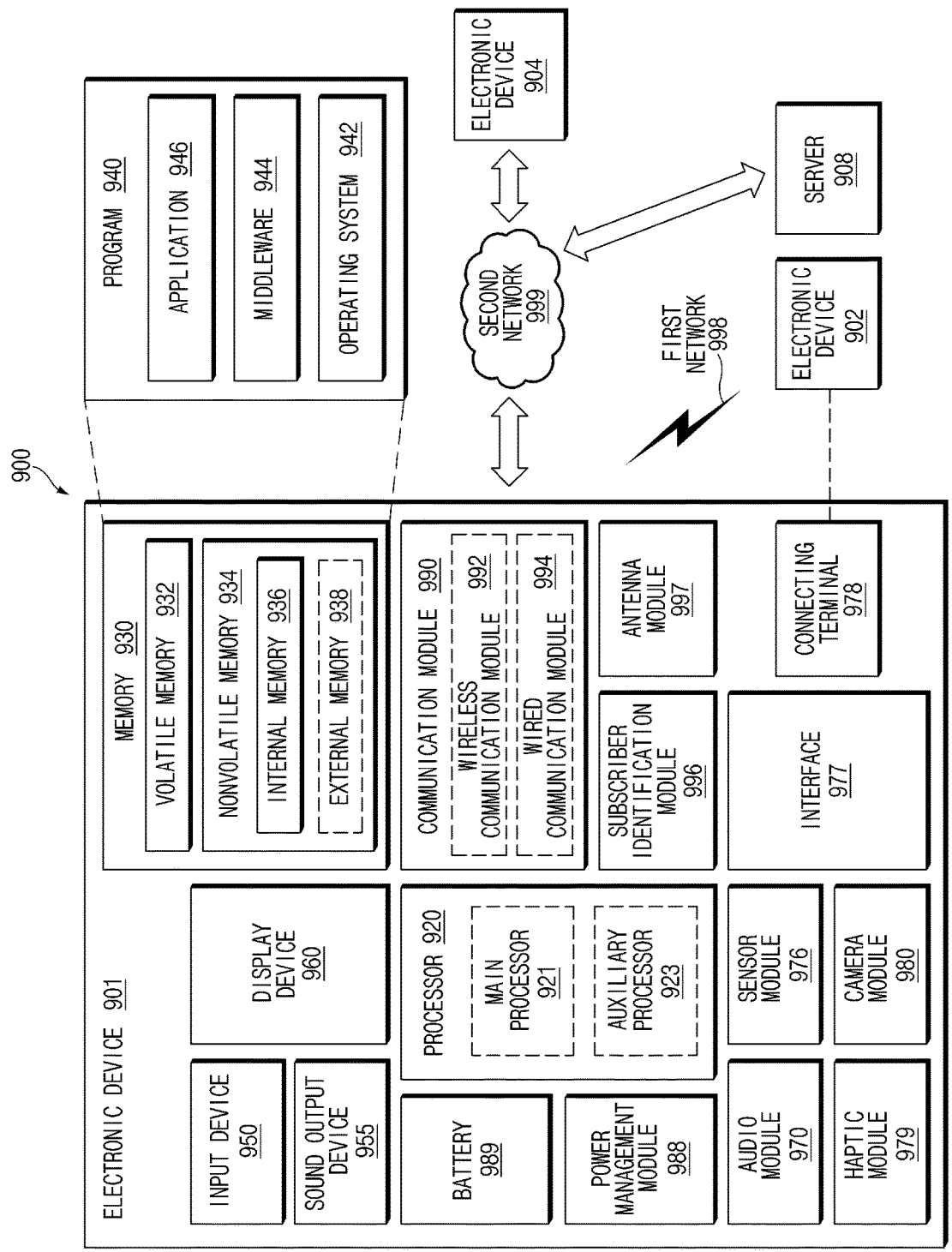
FIG. 9 illustrates a block diagram of an electronic device in a network environment according to an embodiment of the disclosure.

FIG. 9 is a block diagram of an electronic device 901 (e.g., the foldable electronic device 101 of FIG. 1) in a network environment 900, according to an embodiment of the disclosure. Electronic devices according to various embodiments disclosed in the disclosure may be various types of devices. An electronic device may include at least one of, for example, a portable communication device (e.g., a smartphone, a computer device (e.g., a PDA: personal digital assistant), a tablet PC, a laptop PC, a desktop PC, a workstation, or a server), a portable multimedia device (e.g., e-book reader or MP3 player), a portable medical device (e.g., heart rate, blood sugar, blood pressure, or body temperature measuring device), a camera, or a wearable device. The wearable device may include at least one of an accessory type device (e.g., watches, rings, bracelets, anklets, necklaces, glasses, contact lenses, or head wearable device head-mounted-device (HMD)), a fabric or clothing integral device (e.g., an electronic clothing), a body-attached device (e.g., skin pads or tattoos), or an bio implantable circuit. In some embodiments, the electronic device may include at least one of, for example, a television, a DVD (digital video disk) player, an audio device, an audio accessory device (e.g., a speaker, headphones, or a headset), a refrigerator, an air conditioner, a cleaner, an oven, a microwave oven, a washing machine, an air purifier, a set top box, a home automation control panel, a security control panel, a game console, an electronic dictionary, an electronic key, a camcorder, or an electronic picture frame.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 9, the electronic device 901 in the network environment 900 may communicate with an electronic device 902 over a first network 998 (e.g., a short range wireless communication network) or may communicate with an electronic device 904 or a server 908 over a second network 999 (e.g., a long distance wireless communication network). According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, or an antenna module 997. In any embodiment, at least one (e.g., the display device 960 or the camera module 980) of the components may be omitted from the electronic device 901, or one or more other components may be further included in the electronic device 901. In any embodiment, some of the components may be implemented with a single integrated circuit. For example, the sensor module 976 (e.g., a fingerprint sensor, an iris sensor, or an illumination sensor) may be embedded in the display device 960 (e.g., a display).

The processor 920 may execute, for example, software (e.g., a program 940) to control at least one other component (e.g., a hardware or software component) of the electronic device 901 connected to the processor 920, and may perform various data processing or operations. According to an embodiment, as at least a part of the data processing or operations, the processor 920 may load a command or data received from any other component (e.g., the sensor module 976 or the communication module 990) to a volatile memory 932, may process the command or data stored in the volatile memory 932, and may store processed data in a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which may be operated independently of or together with the main processor 921. Additionally or alternatively, the auxiliary processor 923 may be configured to use lower power than the main processor 921 or to be specialized for a specified function. The auxiliary processor 923 may be implemented separately from the main processor 921 or may be implemented as a part of the main processor 921.

The auxiliary processor 923 may control at least a part of a function or states associated with at least one component (e.g., the display device 960, the sensor module 976, or the communication module 990) of the electronic device 901, for example, instead of the main processor 921 while the main processor 921 is in an inactive (e.g., sleep) state and together with the main processor 921 while the main processor 921 is in an active (e.g., an application execution) state. According to an embodiment, the auxiliary processor 923 (e.g., an image signal processor or a communication processor) may be implemented as a part of any other component (e.g., the camera module 980 or the communication module 990) which is functionally (or operatively) associated with the auxiliary processor 923.

The memory 930 may store various data which are used by at least one component (e.g., the processor 920 or the sensor module 976) of the electronic device 901. The data may include, for example, software (e.g., the program 940), or input data or output data associated with a command of the software. The memory 930 may include the volatile memory 932 or the nonvolatile memory 934.

The program 940 may be stored in the memory 930 as software, and may include, for example, an operating system 942, a middleware 944, or an application 946.

The input device 950 may receive a commands or data which will be used by a component (e.g., the processor 920) of the electronic device 901, from the outside (e.g., a user) of the electronic device 901. The input device 950 may include, for example, a microphone, a mouse, or a keyboard.

The sound output device 955 may output a sound signal to the outside of the electronic device 901. The sound output device 955 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 960 may visually provide information to the outside (e.g., the user) of the electronic device 901. The display device 960 may include, for example, a display, a hologram device, or a control circuit for controlling a projector and a corresponding device. According to an embodiment, the display device 960 may include a touch circuitry configured to sense a touch, or a sensor circuitry (e.g., a pressure sensor) configured to measure the strength of force generated by the touch.

The audio module 970 may convert sound to an electrical signal, or reversely, may convert an electrical signal to sound. According to an embodiment, the audio module 970 may obtain sound through the input device 950, or may output sound through the sound output device 955, or through an external electronic device (e.g., the electronic device 902) (e.g., a speaker or a headphone) directly or wirelessly connected with the electronic device 901.

The sensor module 976 may sense an operation state (e.g., power or a temperature) of the electronic device 901 or an external environment state (e.g., a user state), and may generate an electrical signal or a data value corresponding the sensed state. According to an embodiment, the sensor module 976 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 977 may support one or more specified protocols that may be used to directly and wirelessly connect the electronic device 901 with an external electronic device (e.g., the electronic device 902). According to an embodiment, the interface 977 may include, for example, a high definition multimedia interface (HDMI), a universal serial bus (USB) interface, a secure digital (SD) card interface, or an audio interface.

A connecting terminal 978 may include a connector that may allow the electronic device 901 to be physically connected with an external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal to a mechanical stimulation (e.g., vibration or movement) or an electrical stimulation which the user may perceive through the sense of touch or the sense of movement. According to an embodiment, the haptic module 979 may include, for example, a motor, a piezoelectric sensor, or an electrical stimulation device.

The camera module 980 may photograph a still image and a video. According to an embodiment, the camera module 980 may include one or more lenses, image sensors, image signal processors, or flashes (or electrical flashes).

The power management module 988 may manage the power which is supplied to the electronic device 901. According to an embodiment, the power management module 988 may be implemented, for example, as at least a part of a power management integrated circuit (PMIC).

The battery 989 may power at least one component of the electronic device 901. According to an embodiment, the battery 989 may include, for example, a primary cell not recharged, a secondary cell rechargeable, or a fuel cell.

The communication module 990 may establish a direct (or wired) communication channel or a wireless communication channel between the electronic device 901 and an external electronic device (e.g., the electronic device 902, the electronic device 904, or the server 908) or may perform communication through the established communication channel. The communication module 990 may include one or more communication processors which is operated independently of the processor 920 (e.g., an application processor) and supports direct (or wired) communication or wireless communication. According to an embodiment, the communication module 990 may include a wireless communication module 992 (e.g., a cellular communication module, a short range wireless communication module, or a global navigation satellite system (GNSS) communication module) or a wired communication module 994 (e.g., a local area network (LAN) communication module or a power line communication module). A corresponding communication module of such communication modules may communicate with an external electronic device over the first network 998 (e.g., a short range communication network such as Bluetooth, Wi-Fi direct, or infrared data association (IrDA)) or the second network 999 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 992 may verify and authenticate the electronic device 901 within a communication network, such as the first network 998 or the second network 999, by using subscriber information (e.g., international mobile subscriber identity (IMSI)) stored in the subscriber identification module 996.

The antenna module 997 may transmit a signal or a power to the outside (e.g., an external electronic device) or may receive a signal or a power from the outside. According to an embodiment, the antenna module 997 may include one or more antennas, and at least one antenna which is suitable for a communication scheme used in a computer network such as the first network 998 or the second network 999 may be selected, for example, by the communication module 990 from the one or more antennas. The signal or power may be exchanged between the communication module 990 and an external electronic device through the selected at least one antenna or may be received from the external electronic device through the selected at least one antenna and the communication module 990.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 901 and the external electronic device 904 through the server 908 connecting to the second network 999. Each of the electronic devices 902 and 904 may be a device, the kind of which is the same as or different from a kind of the electronic device 901. According to an embodiment, all or a part of operations to be executed in the electronic device 901 may be executed in one or more external devices of the external electronic devices 902, 904, or 908. For example, in the case where the electronic device 901 should perform any function or service automatically or in response to a request from the user or any other device, the electronic device 901 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 901. The electronic device 901 may process received result as it is or additionally, and may provide a result of the processing as at least a part of the response to the request. To this end, for example, a cloud computing, distributed computing, or client-server computing technology may be used.

A foldable electronic device (e.g., the foldable electronic device 101 of FIG. 1) according to various embodiments may include a housing (e.g., the housing 120 of FIG. 1) that includes a first housing (e.g., the first housing 121 of FIG. 1) and a second housing (e.g., the second housing 122 of FIG. 1) and that is folded or unfolded by rotation of the first housing (e.g., the first housing 121 of FIG. 1) or the second housing (e.g., the second housing 122 of FIG. 1), the first housing (e.g., the first housing 121 of FIG. 1) including a notch (e.g., the notch 121a of FIG. 1), a flexible display (e.g., the flexible display 110 of FIG. 1) that is exposed through a first surface of the housing (e.g., the housing 120 of FIG. 1) and that includes a first display part (e.g., the first display part 110a of FIG. 1) mounted in the first housing (e.g., the first housing 121 of FIG. 1) and a second display part (e.g., the second display part 110b of FIG. 1) mounted in the second housing (e.g., the second housing 122 of FIG. 1), a first camera module (e.g., the first camera module 130 of FIG. 1) that is mounted in the first housing (e.g., the first housing 121 of FIG. 1) so as to be exposed through the first surface and that is disposed adjacent to the notch (e.g., the notch 121a of FIG. 1), and a second camera module (e.g., the second camera module 140 of FIG. 1) and a third camera module (e.g., the third camera module 150 of FIG. 1) mounted in the second housing (e.g., the second housing 122 of FIG. 1) so as to be exposed through a second surface opposite to the first surface. The second camera module (e.g., the second camera module 140 of FIG. 1) and the third camera module (e.g., the third camera module 150 of FIG. 1) may be disposed to face the same direction as the first camera module (e.g., the first camera module 130 of FIG. 1) when the first housing (e.g., the first housing 121 of FIG. 1) and the second housing (e.g., the second housing 122 of FIG. 1) are folded.

According to various embodiments, a first portion of the second housing (e.g., the second housing 122 of FIG. 1) that is exposed through the notch (e.g., the notch 121a of FIG. 1) when the first housing (e.g., the first housing 121 of FIG. 1) and the second housing (e.g., the second housing 122 of FIG. 1) are folded may have a greater thickness than the remaining area of the second housing (e.g., the second housing 122 of FIG. 1). The thickness of the first portion may be equal to or smaller than the sum of a thickness of the first housing (e.g., the first housing 121 of FIG. 1) and a thickness of the second housing (e.g., the second housing 122 of FIG. 1). The foldable electronic device (e.g., the foldable electronic device 101 of FIG. 1) may further include a sensor (e.g., the sensor 160 of FIG. 1) disposed in the first portion.

According to various embodiments, the first to third camera modules (e.g., the first to third camera modules 130, 140, and 150 of FIG. 1) may include different types of lenses.

According to various embodiments, the first to third camera modules (e.g., the first to third camera modules 130, 140, and 150 of FIG. 1) may have different viewing angles.

According to various embodiments, the first to third camera modules (e.g., the first to third camera modules 130, 140, and 150 of FIG. 1) may include a super-wide lens, a tele lens, and a wide lens, respectively.

According to various embodiments, the first to third camera modules (e.g., the first to third camera modules 130, 140, and 150 of FIG. 1) may be disposed along a first axis parallel to an upper edge of the housing (e.g., the housing 120 of FIG. 1) when the first housing (e.g., the first housing 121 of FIG. 1) and the second housing (e.g., the second housing 122 of FIG. 1) are folded.

According to various embodiments, the flexible display (e.g., the flexible display 110 of FIG. 1) may have a shape corresponding to the notch (e.g., the notch 121a of FIG. 1) in an area adjacent to the notch (e.g., the notch 121a of FIG. 1).

According to various embodiments, the foldable electronic device (e.g., the foldable electronic device 101 of FIG. 1) may further include a processor (e.g., the processor 920 of FIG. 9) that is disposed in the housing (e.g., the housing 120 of FIG. 1) and that controls the first to third camera modules (e.g., the first to third camera modules 130, 140, and 150 of FIG. 1), and the processor (e.g., the processor 920 of FIG. 9) may operate in a first mode using the first camera module (e.g., the first camera module 130 of FIG. 1), or in a second mode using the second camera module (e.g., the second camera module 140 of FIG. 1) and the third camera module (e.g., the third camera module 150 of FIG. 1), when the first housing (e.g., the first housing 121 of FIG. 1) and the second housing (e.g., the second housing 122 of FIG. 1) are unfolded. The processor (e.g., the processor 920 of FIG. 9) may display, through at least part of the flexible display (e.g., the flexible display 110 of FIG. 1), image data collected depending on the first mode or the second mode.

According to various embodiments, the processor (e.g., the processor 920 of FIG. 9) may display, through at least part of the flexible display (e.g., the flexible display 110 of FIG. 1), an image obtained by combining first image data depending on the first mode and second image data depending on the second mode.

According to various embodiments, when the first housing (e.g., the first housing 121 of FIG. 1) and the second housing (e.g., the second housing 122 of FIG. 1) are changed from an unfolded state to a folded state, the processor (e.g., the processor 920 of FIG. 9) may operate in a third mode in which at least two of the first to third camera modules (e.g., the first to third camera modules 130, 140, and 150 of FIG. 1) are combined and used.

According to various embodiments, the processor (e.g., the processor 920 of FIG. 9) may display image data collected depending on the third mode, through one of the first display part (e.g., the first display part 110a of FIG. 1) and the second display part (e.g., the second display part 110b of FIG. 1).

According to various embodiments, the first housing (e.g., the first housing 121 of FIG. 1) and the second housing (e.g., the second housing 122 of FIG. 1) may be folded in an outward folding type, and the second camera module (e.g., the second camera module 140 of FIG. 1) and the third camera module (e.g., the third camera module 150 of FIG. 1) may be exposed through the notch (e.g., the notch 121a of FIG. 1).

According to various embodiments, the first housing (e.g., the first housing 121 of FIG. 1) and the second housing (e.g., the second housing 122 of FIG. 1) may be folded in an inward folding type, and the first camera module (e.g., the first camera module 130 of FIG. 1) may be exposed through the notch (e.g., the notch 121a of FIG. 1).

An electronic device (e.g., the foldable electronic device 101 of FIG. 1) according to various embodiments may include: a foldable housing (e.g., the housing 120 of FIG. 1) that includes a hinge structure, a first housing structure (e.g., the first housing 121 of FIG. 1) that is connected to the hinge structure and that includes a first surface facing a first direction and a second surface facing a second direction opposite to the first direction, and a second housing structure (e.g., the second housing 122 of FIG. 1) that is connected to the hinge structure and that includes a third surface facing a third direction and a fourth surface facing a fourth direction opposite to the third direction, the second housing structure being folded about the hinge structure together with the first housing structure (e.g., the first housing 121 of FIG. 1), in which the second surface faces the fourth surface in a folded state, the third direction is the same as the first direction in an unfolded state, and a portion of a periphery of the first housing structure (e.g., the first housing 121 of FIG. 1) is cut, or a through-opening is included in the first housing structure (e.g., the first housing 121 of FIG. 1), such that a first area of the fourth surface is visible when viewed from above the first surface in the folded state; a flexible display (e.g., the flexible display 110 of FIG. 1) that extends from the first surface to the third surface and that includes a first part that forms the first surface and a second part that forms the third surface; a first camera (e.g., the first camera module 130 of FIG. 1) that is disposed on the first surface of the first housing structure (e.g., the first housing 121 of FIG. 1) so as to be adjacent to the first area when viewed from above the first surface in the folded state and that faces the first direction; a second camera (e.g., the second camera module 140 of FIG. 1) that is disposed on the first area of the fourth surface of the second housing structure (e.g., the second housing 122 of FIG. 1) and that faces the fourth direction; and a third camera (e.g., the third camera module 150 of FIG. 1) that is disposed on the first area of the fourth surface of the second housing structure (e.g., the second housing 122 of FIG. 1) so as to be located farther away from the first camera than the second camera and that faces the fourth direction.

According to various embodiments, the electronic device (e.g., the foldable electronic device 101 of FIG. 1) may further include a processor (e.g., the processor 920 of FIG. 9) operatively connected with the first to third cameras (e.g., the first to third cameras 130, 140, and 150 of FIG. 1) and a memory operatively coupled with the processor. The memory (e.g., the memory 930 of FIG. 9) may store instructions that, when executed, cause the processor (e.g., the processor 920 of FIG. 9) to operate the first camera (e.g., the first camera module 130 of FIG. 1) and the second camera at substantially the same time in the folded state in response to a user input and to operate the second camera (e.g., the second camera module 140 of FIG. 1) and the third camera (e.g., the third camera module 150 of FIG. 1) at substantially the same time in the unfolded state in response to the user input.

According to various embodiments, the first camera (e.g., the first camera module 130 of FIG. 1) may have a first zoom magnification, the second camera (e.g., the second camera module 140 of FIG. 1) may have a second zoom magnification higher than the first zoom magnification of the first camera, and the third camera (e.g., the third camera module 150 of FIG. 1) may have a third zoom magnification higher than the second zoom magnification of the second camera (e.g., the second camera module 140 of FIG. 1).

According to various embodiments, the first to third camera modules (e.g., the first to third camera modules 130, 140, and 150 of FIG. 1) may be aligned with one another.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 940) including an instruction stored in a machine-readable storage medium (e.g., an internal memory 936 or an external memory 938) readable by a machine (e.g., the electronic device 901). For example, the processor (e.g., the processor 920) of a machine (e.g., the electronic device 901) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to the various embodiments of the disclosure, the foldable electronic device may be folded such that the rear camera faces the same direction as the front camera through the notch of the housing in the folded state.

Furthermore, the foldable electronic device may reduce mounting spaces of the plurality of camera modules through the notch of the housing.

In addition, the foldable electronic device may take an image having various effects by using the plurality of camera modules disposed to face the same direction in the folded state.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
    a housing configured to be folded or unfolded by rotation of a first housing or a second housing, the first housing including a notch;
    a flexible display exposed through a first surface of the housing, the flexible display including a first display part mounted in the first housing and a second display part mounted in the second housing;
    a first camera module mounted in the first housing and exposed through the first surface, the first camera module being disposed adjacent to the notch; and
    a second camera module and a third camera module mounted in the second housing and exposed through a second surface opposite to the first surface,
    wherein, when the housing is folded, at least one of the second camera module or the third camera module is disposed at a location in the second housing such that the at least one of the second camera module or the third camera module is exposed through the notch and disposed to face an identical direction as the first camera module.

2. The foldable electronic device of claim 1, wherein a first portion of the second housing that is exposed through the notch when the first housing and the second housing are folded has a greater thickness than a remaining area of the second housing.

3. The foldable electronic device of claim 2, wherein the thickness of the first portion is equal to or smaller than a sum of a thickness of the first housing and a thickness of the remaining area.

4. The foldable electronic device of claim 2, further comprising:
a sensor disposed in the first portion.

5. The foldable electronic device of claim 1, wherein the first camera module, the second camera module, and the third camera module include different types of lenses.

6. The foldable electronic device of claim 1, wherein the first camera module, the second camera module, and the third camera module have different viewing angles.

7. The foldable electronic device of claim 1, wherein the first camera module comprises a super-wide lens, the second camera module comprises a tele lens, and the third camera module comprises a wide lens.

8. The foldable electronic device of claim 1, wherein, when the first housing and the second housing are folded, the first camera module, the second camera module, and the third camera module are disposed along a first axis parallel to an upper edge of the housing.

9. The foldable electronic device of claim 1, wherein the flexible display has a shape accommodating the notch in an area adjacent to the notch.

10. The foldable electronic device of claim 1, further comprising:
a processor disposed in the housing and configured to control the first camera module, the second camera module, and the third camera module,
wherein the processor is further configured to, when the housing is folded, operate in one of a first mode using the first camera module or in a second mode using the second camera module and the third camera module.

11. The foldable electronic device of claim 10, wherein the processor is further configured to control the flexible display to display image data collected based on the first mode or the second mode.

12. The foldable electronic device of claim 10, wherein the processor is further configured to combine a first image data based on the first mode and second image data based on the second mode into a combined image and control the flexible display to display the combined image.

13. The foldable electronic device of claim 10, wherein, when the first housing and the second housing are changed from an unfolded state to a folded state, the processor is further configured to operate in a third mode that combines at least two of the first camera module, the second camera module, and the third camera module.

14. The foldable electronic device of claim 13, wherein the processor is further configured to control the flexible display to display image data collected based on the third mode through one of the first display part and or the second display part.

15. An electronic device comprising:
a foldable housing including:
a hinge structure;
a first housing structure connected to the hinge structure, the first housing structure including a first surface facing a first direction and a second surface facing a second direction opposite to the first direction, and
a second housing structure connected to the hinge structure, the second housing structure including a third surface facing a third direction and a fourth surface facing a fourth direction opposite to the third direction, and the second housing structure being folded about the hinge structure together with the first housing structure,
wherein, in a folded state, the second surface faces the fourth surface, and in an unfolded state, the third direction is the same as the first direction, and
wherein the first housing structure comprises a notch exposing a first area of the fourth surface when viewed from above the first surface in the folded state;
a flexible display extending from the first surface to the third surface and including a first part configured to form the first surface and a second part configured to form the third surface;
a first camera disposed on the first surface and adjacent to the first area when viewed from above the first surface in the folded state, the first camera being configured to face the first direction;
a second camera disposed on the first area of the fourth surface and configured to face the fourth direction, the notch exposing the second camera in the folded state; and
a third camera disposed on the first area of the fourth surface and located farther away from the first camera than the second camera, the third camera being configured to face the fourth direction, the notch further exposing the third camera in the folded state.

16. The electronic device of claim 15, further comprising:
a processor operatively connected with the first camera, the second camera, and the third camera; and
a memory operatively coupled with the processor,
wherein the memory stores instructions that, when executed, cause the processor to:
in response to a user input in the folded state, operate the first camera and the second camera at substantially the same time; and
in response to the user input in the unfolded state, operate the second camera and the third camera at substantially the same time.

17. The electronic device of claim 15,
wherein the first camera comprises a first zoom magnification,
wherein the second camera comprises a second zoom magnification greater than the first zoom magnification, and
wherein the third camera comprises a third zoom magnification greater than the second zoom magnification.

18. The electronic device of claim 15, wherein the first camera, the second camera, and the third camera are aligned on a first axis.

19. The electronic device of claim 18, wherein the first camera and the second camera are aligned on a second axis.

20. The electronic device of claim 15,
wherein the second housing structure comprises a raised portion, the raised portion having a thickness which is greater than a thickness of a remaining portion of the second housing, and
wherein the second camera and the third camera are disposed in the raised portion.

* * * * *